United States Patent
Allen et al.

(10) Patent No.: US 7,775,555 B2
(45) Date of Patent: Aug. 17, 2010

(54) BREAK-AWAY PEDAL ASSEMBLY

(75) Inventors: James Robert Allen, Bellaire, MI (US);
Brian John Eckerle, Petoskey, MI (US);
Jason Allen Booher, Atlanta, MI (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 245 days.

(21) Appl. No.: 12/062,945

(22) Filed: Apr. 4, 2008

(65) Prior Publication Data
US 2009/0250285 A1  Oct. 8, 2009

(51) Int. Cl.
*B60R 21/08* (2006.01)
(52) U.S. Cl. ................................. 280/748; 180/274
(58) Field of Classification Search .............. 280/748; 180/274
See application file for complete search history.

(56) References Cited

U.S. PATENT DOCUMENTS

| | | | |
|---|---|---|---|
| 5,615,749 A | 4/1997 | Kato | |
| 5,848,558 A * | 12/1998 | Isono et al. | 74/512 |
| 5,848,662 A * | 12/1998 | Sakaue | 180/274 |
| 6,041,674 A * | 3/2000 | Kato | 74/512 |
| 6,055,883 A | 5/2000 | Kato | |
| 6,112,616 A | 9/2000 | Schonlau et al. | |
| 6,176,340 B1 * | 1/2001 | Mizuma et al. | 180/274 |
| 6,178,846 B1 * | 1/2001 | Specht et al. | 74/512 |
| 6,186,025 B1 | 2/2001 | Engelgau et al. | |
| 6,279,417 B1 * | 8/2001 | Mizuma et al. | 74/512 |
| 6,393,934 B1 | 5/2002 | Rixon et al. | |
| 6,408,711 B1 | 6/2002 | Mizuma et al. | |
| 6,752,038 B2 * | 6/2004 | Cordero | 74/512 |
| 6,808,040 B2 * | 10/2004 | Hayashihara et al. | 180/315 |
| 7,195,091 B2 | 3/2007 | Rixon et al. | |
| 7,228,759 B2 * | 6/2007 | Jagger et al. | 74/512 |
| 7,275,614 B2 * | 10/2007 | Hayashi | 180/274 |
| 7,415,909 B2 * | 8/2008 | Miyoshi et al. | 74/560 |
| 7,434,648 B2 * | 10/2008 | Hayashi | 180/274 |
| 7,568,545 B2 * | 8/2009 | Tanigawa et al. | 180/274 |

FOREIGN PATENT DOCUMENTS

GB  2353009 A  2/2001

* cited by examiner

*Primary Examiner*—Paul N Dickson
*Assistant Examiner*—Nicole Verley
(74) *Attorney, Agent, or Firm*—Porter, Wright, Morris & Arthur, LLP; Richard M. Mescher; Dean B. Watson

(57) ABSTRACT

A vehicle includes a first structure, a pedal pivotably connected to the first structure for pivoting between rest and fully-applied positions, a control attachment connecting the pedal to a vehicle system to be controlled, a second structure located rearward of the pedal, and an engagement bracket connected to the pedal to engage the second structure upon rearward movement of the pedal during a vehicle frontal collision. The control attachment is connected to the engagement bracket and disengages from the pedal so that the pedal pivots independent of the control system when the engagement bracket strikes the second structure with a predetermined force. There is a constant distance between the engagement bracket and the second structure as the pedal pivots so that the position of the pedal does not affect the disengagement of the control attachment during the frontal collision.

19 Claims, 6 Drawing Sheets

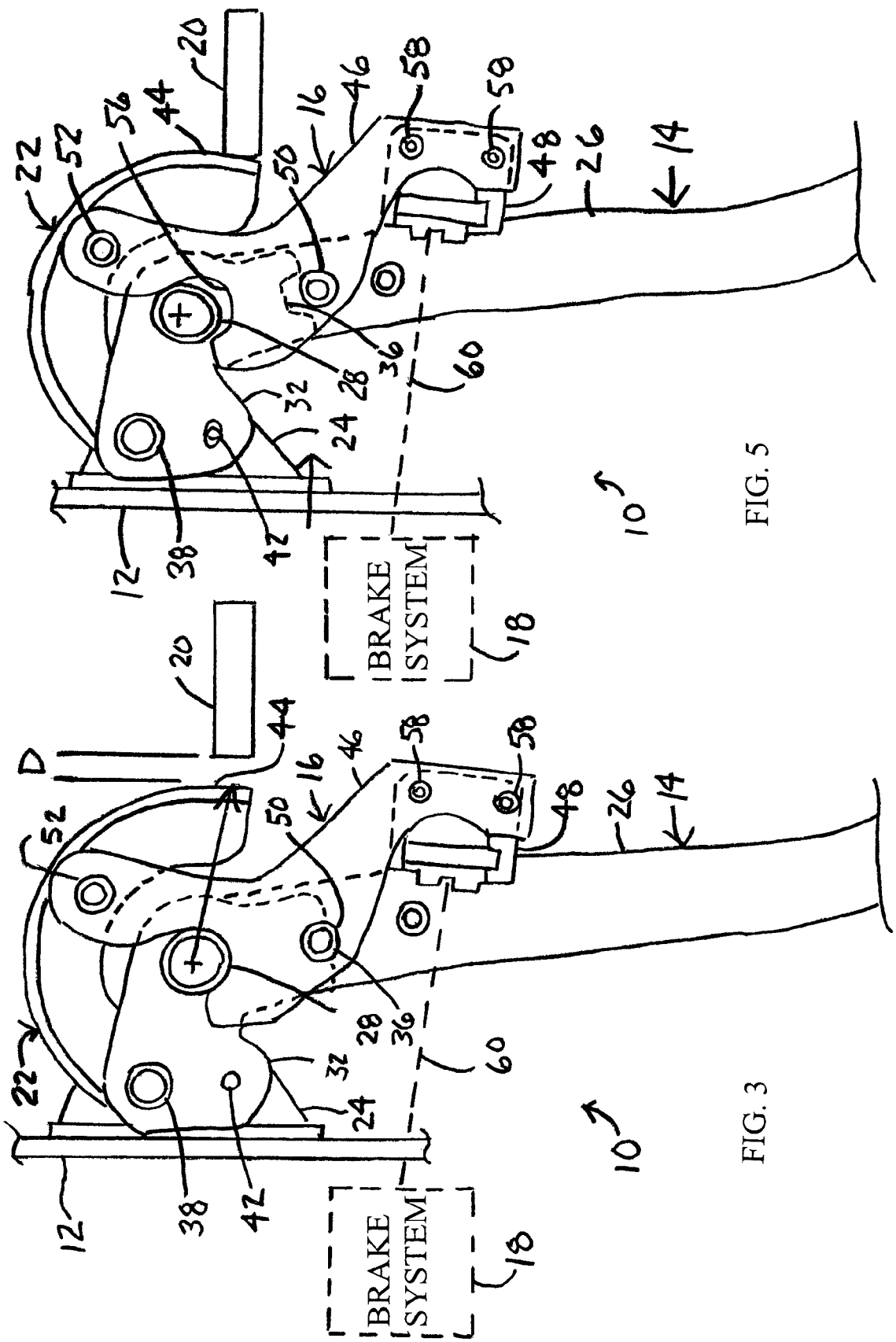

BREAK-AWAY PEDAL ASSEMBLY

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The field of the present invention generally relates to control pedal assemblies for motor vehicles and, more particularly, to such control pedal assemblies which decouple during frontal vehicle collisions.

BACKGROUND OF THE INVENTION

Control pedals are typically provided in a motor vehicle, such as an automobile, which are foot operated by the driver. Separate control pedals are typically provided for operating vehicle brakes and an engine throttle. When the motor vehicle has a manual transmission, a third control pedal is provided for operating a transmission clutch. Each control pedal typically has a pedal arm mounted to pivot between an at-rest or unapplied position and a fully applied position. Control pedals of this type typically include a mechanism that connects the pedal arm with the vehicle system to be actuated (brake system, throttle, system, or clutch system). This mechanism transmits force applied to the pedal arm by the operator to the system to be actuated.

Control pedals can also include crash management systems wherein the connection between the pedal arm and the vehicle system to be actuated is decoupled during a collision so that the pedal can move independent of the vehicle system to be actuated. The systems decouple the pedal arm from the system to be actuated during a collision to decrease interaction between the pedal and the operator's foot during the collision. It is believed that injuries to lower extremities of the operator can be reduced and/or avoided during a collision by reducing the interaction between the pedal and the operator's foot.

Operation of many prior crash management systems can be affected by the position of the pedal between its at-rest to fully applied positions. Additionally, many prior crash management systems are expensive to repair or replace after a collision. Accordingly, there is a need in the art for improved control pedal assemblies with crash management systems.

SUMMARY OF THE INVENTION

Disclosed herein is a control pedal assembly which consistently decouples during frontal vehicle collisions regardless of the operational position of the pedal at the time of collision. According to one embodiment there is disclosed herein a vehicle comprising, in combination, a first vehicle structure, a pedal pivotably connected to the first vehicle structure for pivoting movement in a normal operating range between a rearward position and a forward position, a control attachment operably connecting the pedal to a vehicle system to be controlled for transmitting normal operating loads therebetween, a second vehicle structure located rearward of the pedal, and an engagement bracket operably connected to the pedal and sized and shaped to engage the second vehicle structure upon rearward movement of the pedal in a rearward direction during a vehicle frontal collision. There is a constant distance between the engagement bracket and the second vehicle structure in the forward-rearward direction as the pedal pivots between the rearward position and the forward position. The control attachment is operably connected to the engagement bracket to disengage the control attachment from the pedal so that the pedal pivots independent of the control system when the engagement bracket strikes the vehicle structure with a predetermined force.

According to another embodiment there is disclosed herein a vehicle comprising, in combination, a first vehicle structure, a pedal pivotably connected to the first vehicle structure for pivoting movement in a normal operating range between a rearward position and a forward position, a control attachment operably connecting the pedal to a vehicle system to be controlled for transmitting normal operating loads therebetween, a second vehicle structure located rearward of the pedal, and an engagement bracket operably connected to the pedal and sized and shaped to engage the second vehicle structure upon rearward movement of the pedal in a rearward direction during a vehicle frontal collision. The control attachment is operably connected to the engagement bracket to disengage the control attachment from the pedal so that the pedal pivots independent of the control system when the engagement bracket strikes the vehicle structure with a predetermined force. The engagement bracket is secured to the pedal with a frangible connection that breaks at the predetermined force. The control attachment engages the pedal so that the control attachment pivots with the pedal under normal operation. The control attachment moves to disengage from the pedal so that the pedal pivots independent of the control attachment when the frangible connection breaks.

According to yet another embodiment disclosed herein a vehicle comprising, in combination, a first vehicle structure, a pedal pivotably connected to the first vehicle structure for pivoting movement in a normal operating range between a rearward position and a forward position, a control attachment operably connecting the pedal to a vehicle system to be controlled for transmitting normal operating loads therebetween, a second vehicle structure located rearward of the pedal, and an engagement bracket operably connected to the pedal and sized and shaped to engage the second vehicle structure upon rearward movement of the pedal in a rearward direction during a vehicle frontal collision. There is a constant distance between the engagement bracket and the second vehicle structure in the forward-rearward direction as the pedal pivots between the rearward position and the forward position. The control attachment is pivotably connected to the engagement bracket to disengage the control attachment from the pedal so that the pedal pivots independent of the control system when the engagement bracket strikes the vehicle structure with a predetermined force. The engagement bracket is secured to the pedal with a frangible connection that breaks at the predetermined force and is pivotably connected to the pedal when the frangible connection breaks. The control attachment carries a pin which engages a notch of the pedal so that the control attachment pivots with the pedal under normal operation. The control attachment pivots downward to disengage the pin from the notch so that the pedal pivots independent of the control attachment when the frangible connection breaks.

From the foregoing disclosure and the following more detailed description of various preferred embodiments it will be apparent to those skilled in the art that the present invention provides a significant advance in the technology and art of control pedal assemblies. Particularly significant in this regard is the potential the invention affords for providing a high quality pedal assembly that decouples under the same conditions throughout its range of operation. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein:

FIG. 3 is a fragmented, left-side elevational view of the control pedal assembly of FIGS. 1 and 2, wherein the pedal assembly is in its unapplied position during normal operation;

FIG. 5 is a fragmented, left-side elevational view of the control pedal assembly of FIGS. 1 to 4, similar to FIG. 3 but during a frontal vehicle collision;

Figure 8:
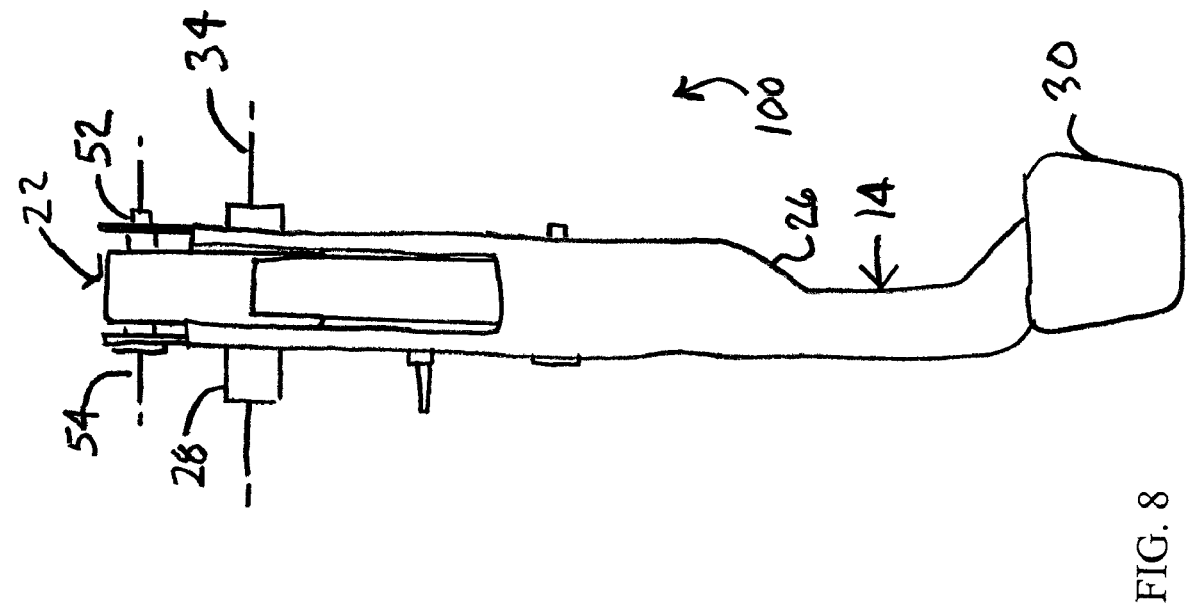
FIG. 8 is a rear elevational view of the control pedal assembly of FIG. 7.
Figure 7:
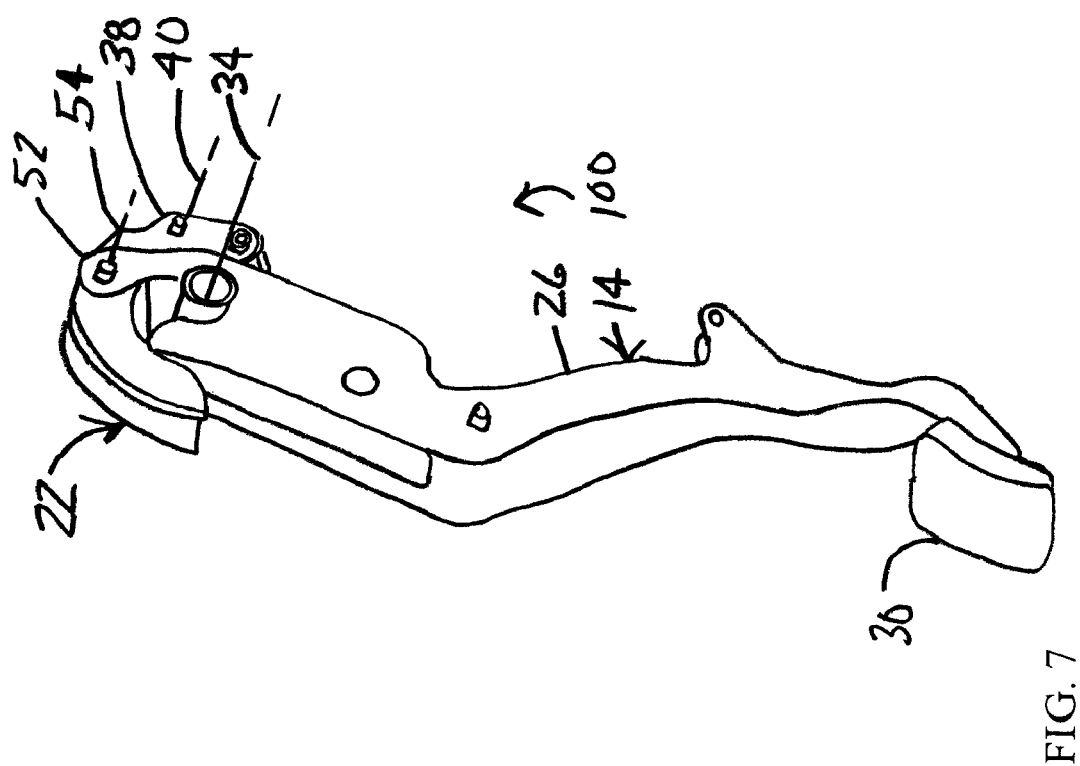
FIG. 7 is a right-rear perspective view of a control pedal assembly according to a second embodiment of the present invention.
Figure 12:
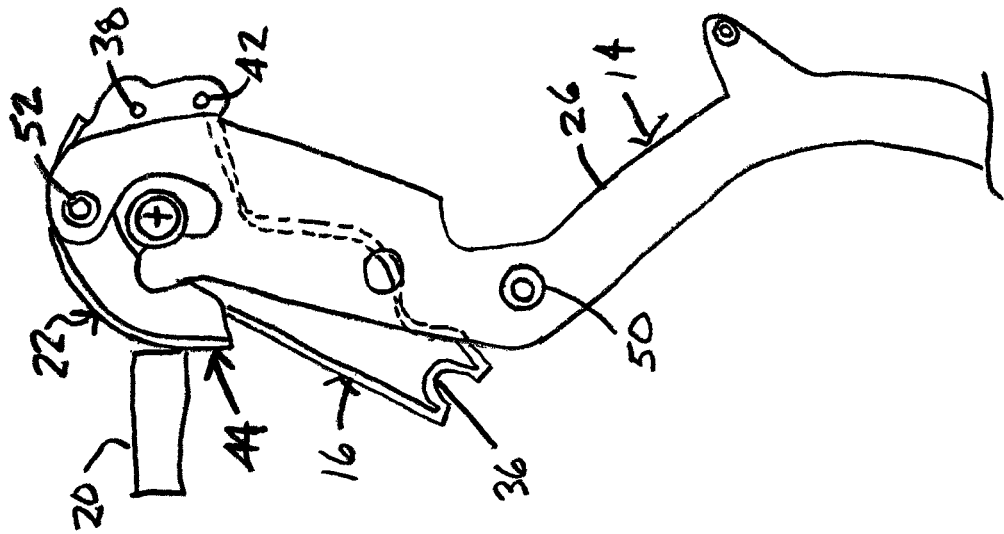
FIG. 12 is a fragmented, right-side elevational view of the control pedal assembly of FIGS. 7 to 11, wherein the pedal assembly is in its fully applied position and fully released from an attachment arm due to a frontal vehicle collision.
Figure 9:
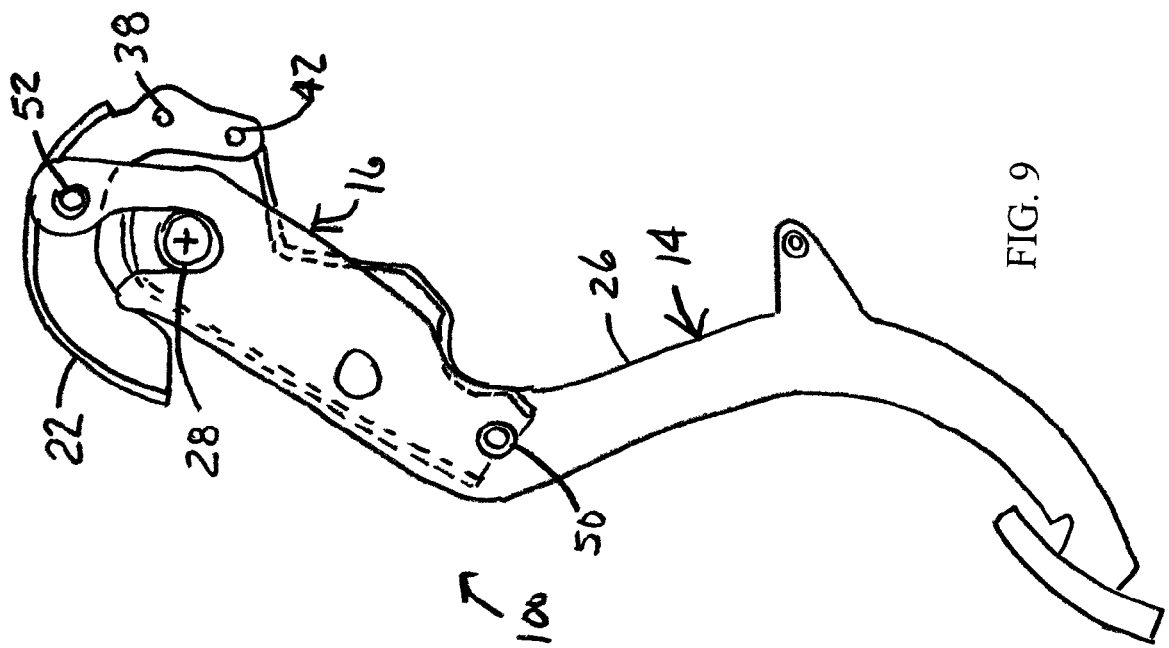
FIG. 9 is a right-side elevational view of the control pedal assembly of FIGS. 7 and 8, wherein the pedal assembly is in its unapplied position during normal operation.
Figure 10:
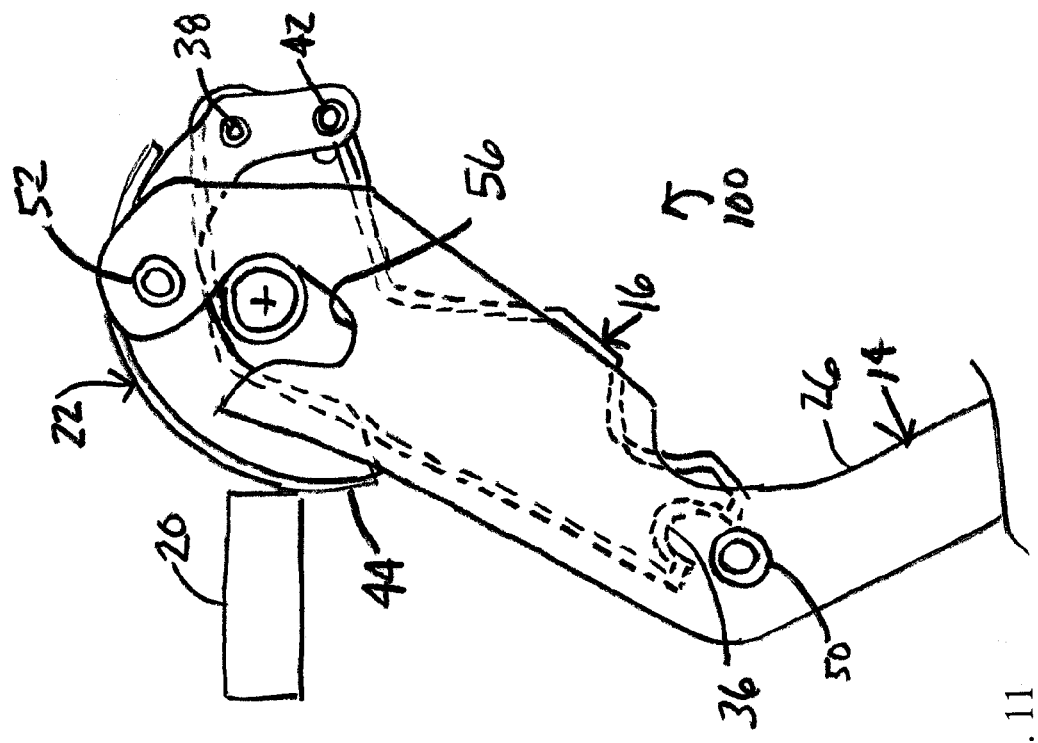
FIG. 10 is fragments, a right-side elevational view of the control pedal assembly of FIGS. 7 to 9, wherein the pedal assembly is in its unapplied position and just engaging a vehicle structure during a frontal vehicle collision.
Figure 11:
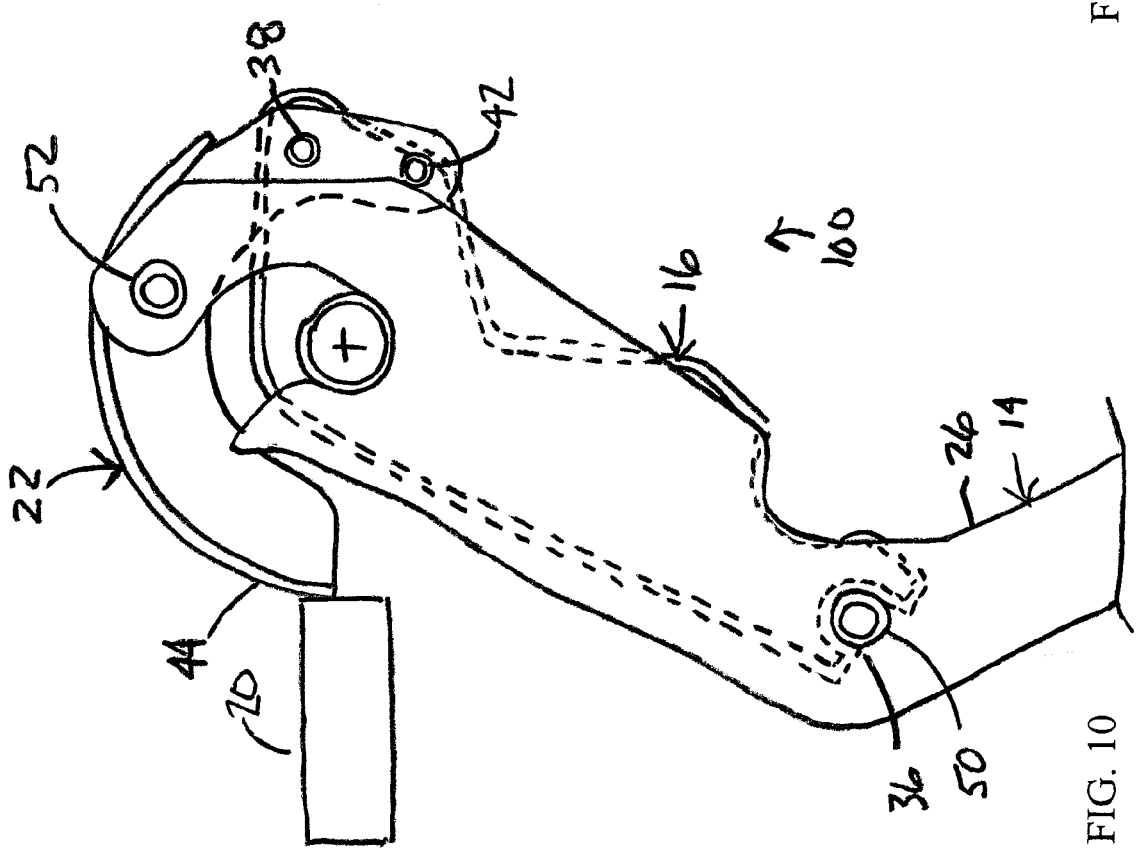
FIG. 11 is a fragmented, right-side elevational view of the control pedal assembly of FIGS. 7 to 10, similar to FIG. 10 but fully released from an attachment arm due to a frontal vehicle collision.

It should be understood that the appended drawings are not necessarily to scale, presenting a somewhat simplified representation of various preferred features illustrative of the basic principles of the invention. The specific design features of control pedal assemblies as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the control pedal assemblies illustrated in the drawings. In general, up or upward refers to an upward direction in the plane of the paper in FIGS. 2 and 8 and down or downward refers to a down direction in the plane of the paper in FIGS. 2 and 8. Also in general, fore or forward refers to a direction toward the front of the motor vehicle and in a direction into the plane of the paper in FIGS. 2 and 8 and aft, rear, or rearward refers to a direction toward the rear of the motor vehicle and a direction into the plane of the paper in FIGS. 2 and 8.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved control pedal assemblies disclosed herein. The following detailed discussion of various alternative and preferred embodiments will illustrate the general principles of the invention with reference to a brake pedal assembly for use with a motor vehicle. Other embodiments suitable for other applications will be apparent to those skilled in the art given the benefit of this disclosure.

FIGS. 1 to 6 illustrate a vehicle 10 according to a first embodiment of the present invention. The illustrated vehicle 10 includes a first vehicle structure 12, a pedal or pedal assembly 14 pivotably connected to the first vehicle structure for pivoting movement in a normal operating range between a rearward rest or unapplied position and a forward fully-applied position, a control attachment 16 operably connecting the pedal 14 to a vehicle system 18 to be controlled for transmitting normal operating loads therebetween, a second vehicle structure 20 located rearward of the pedal 14, and an engagement bracket 22 operably connected to the pedal 14 and sized and shaped to engage the second vehicle structure 20 upon rearward movement of the pedal 14 in a rearward direction during a vehicle frontal collision. The control attachment 16 is operably connected to the engagement bracket 22 to disengage the control attachment 16 from the pedal 14 so that the pedal 14 pivots independently of the control attachment 16 when the engagement bracket 22 strikes the second vehicle structure 20 with a predetermined force as is described in more detail hereinafter.

The illustrated first vehicle structure 12 is a firewall, dash structure, or other rigid structure of the vehicle 10 suitable for mounting the pedal 14. The illustrated first vehicle structure 12 has a mounting bracket 24 rigidly secured thereto in a known manner. The mounting bracket 24 pivotably supports the pedal 14 for pivoting movement in a normal operating range between the rest position (best shown in FIGS. 3 and 4) and the fully-applied position (best shown in FIGS. 5 and 6). The mounting bracket 24 can be of any suitable type.

The illustrated pedal 14 includes a pedal arm 26, a pivot or axle 28, a pedal pad 30, and a control bracket or arm 32. The illustrated pedal arm 26 is generally an elongate plate oriented in a forward-rearward and vertical plane. The illustrated pivot 28 extends laterally from the top of the pedal arm 26 to form a laterally extending, horizontal pivot axis 34 for the pedal 14. The illustrated pivot 28 is rigidly secured to the pedal arm 26 for pivoting movement therewith. The illustrated pivot 28 is cylindrical shaped and cooperates with the mounting bracket 24 to pivotably support the pedal 14. The illustrated pedal pad 30 is located at the bottom of the pedal arm 26 and is rearward facing. The pedal pad 30 is adapted for depression by the driver of the motor vehicle to pivot the pedal arm 26 about the pivot axis 34 to obtain a desired control input to the control or brake system 18 of the motor vehicle 10. It is noted that while the illustrated pedal pad 30 is formed separate and attached to the pedal arm 26, the pedal pad 30 can be formed unitary with the pedal arm 26 within the scope of the present invention.

The illustrated control bracket 32 is a plate oriented in forward-rearward and vertical plane generally parallel and spaced apart from the pedal arm 26. The illustrated control bracket 32 is rigidly secured to the pivot 28 for pivoting movement with the pivot 28 and the pedal arm 26 so that they pivot in unison about the pivot axis 34. The illustrated control bracket 32 has a first or forward portion which extends forwardly from the pivot and second or rearward portion that downwardly extends from the pivot 28 adjacent to the pedal arm 26. The illustrated first portion has a pair of vertically spaced openings for operatively connecting the engagement bracket 22 to the to the control bracket 32 as described in more detail hereinafter. The illustrated second portion has a downward facing notch 36 at a bottom edge for operatively cooperating with the control or booster attachment 16 as described in more detail hereinafter.

The illustrated engagement bracket 22 operably connected to the pedal 14 and is sized and shaped to engage the second vehicle structure 20 upon a predetermined rearward movement of the first vehicle structure 12 and the pedal 14 in a rearward direction during a vehicle frontal collision. The second vehicle structure 20 is located rearward of the pedal 14 and the engagement bracket 22. The illustrated second vehicle structure 20 is a cross beam, steering column, or other rigid structure of the motor vehicle 10 suitable for engagement by the engagement bracket 22.

The illustrated engagement bracket 22 is secured to control bracket 32 with a pivot pin 38 laterally extending into the top opening of the control bracket 32 to form a horizontal and laterally extending pivot axis 40 for the engagement bracket 22 for pivoting movement of the engagement bracket 22 relative to the control bracket 32. The illustrated engagement bracket 22 is also secured to the control bracket 32 with a fuse or shear pin 42 laterally extending into the bottom opening in the control bracket 32 to form a frangible connection therebetween that breaks at a predetermined force or load created when the engagement bracket 22 engages the second vehicle structure 20. The shear pin 42 is frangible for destruction in response to the predetermined load. It is noted that the frangible connection can alternatively be formed in any other suitable manner. Mounted in this manner, the engagement bracket 22 is secured to the pedal 14 for pivoting motion therewith during normal operation and pivots downward relative to the pedal 14 about the pivot axis 40 when the frangible connection breaks.

The illustrated engagement bracket 22 has a generally vertical portion and a generally horizontal portion laterally extending from an upper edge of the vertical portion. The forward end of the vertical portion is secured to the control bracket 32. The forward end of the horizontal portion is adapted to form a generally rearward facing engagement surface 44 for engaging the second vehicle structure 20 during a vehicle frontal collision.

There is preferably a constant gap or distance D between the engagement bracket 22 and the second vehicle structure 20 in the forward-rearward direction as the pedal 14 pivots between the unapplied position and the fully-applied position so that the position of the pedal 14 does not affect the disengagement of the control attachment 16 during a frontal collision. The illustrated horizontal portion of the engagement bracket 22 is generally arcuate having a center of curvature substantially at the pivot axis 34 of the pedal 14. Mounted in this manner, the engagement surface 44 extends radially about the pivot axis 34 in a coaxial manner and pivots about the pivot axis 34 in unison with the pedal 14 so that the gap D remains constant regardless of the pivoted position of the pedal 14. That is, the gap D when the pedal 14 is in the unapplied position (best shown in FIGS. 3 and 4) is substantially equal to the gap D when the pedal 14 is in the fully-applied position (best shown in FIGS. 5 and 6).

The illustrated control attachment 16 includes a pair of spaced apart attachment arms 46, a booster bracket 48, and a release pin 50. Each illustrated attachment arm 46 is a plate oriented in forward-rearward and vertical plane generally parallel and spaced apart from the pedal arm 26 and the control bracket 32. The illustrated attachment arms 46 are laterally spaced apart and located on opposite lateral sides of the control bracket 32. The illustrated attachment arms 46 are rigidly secured to one another so that they move in unison. Each illustrated attachment arm 46 has a first or upper portion which extends upwardly from the pivot at a rearward side of the pivot 28 and a second or lower portion that downwardly extends from the pivot 28 partially adjacent the control bracket 32 at least at the downward facing notch 36. The illustrated first portions have openings at upper ends thereof for receiving a pivot pin 52 which spaces apart the attachment arms 46 and pivotably connects the attachment arms 46 to the engagement bracket 22. The pivot pin 52 forms a horizontal and laterally extending pivot axis 54 for the control attachment 16 relative to the engagement bracket 22. The illustrated pivot pin 52 is located rearward and above the pivot 28. The first portion also includes an upward and forward facing notch 56 sized and shaped for receiving the pivot 28 therein. The illustrated second portions have the booster bracket 48 located at lower ends thereof. The booster bracket 48 is located between the attachment arms 46 and spaces the attachment arms 46 laterally part. The illustrated booster bracket 48 is rigidly secured to the attachment arms 46 with mechanical fasteners 58 but can alternatively be secured by any other suitable means. The illustrated second portions also have openings for receiving the release pin 50 which spaces apart the attachment arms 46 and connects the attachment arms 46. The release pin 50 is positioned so that it is received in the notch 36 of the control bracket 32 when the control attachment 16 is in a normal or engaged position so that the control attachment 16 pivots in unison with the pedal arm 26 and control bracket 32. However, the release pin 50 is also positioned so that it disengages the notch 36 of the control bracket 32 when the control attachment 16 moves to a released or disengaged position during a vehicle frontal collision so that the pedal arm 26 and control bracket 32 pivot independent of the control attachment 16 as described in more detail hereinafter.

The control attachment 16 operably connects the pedal 14 to the brake or other vehicle system 18 to be controlled for transmitting normal operating loads therebetween. The illustrated connection includes a booster rod or link 60 extending from the booster bracket 48 to the brake system 18 to transmit forces through the pedal arm 26 to the brake system 18.

Figure 2:
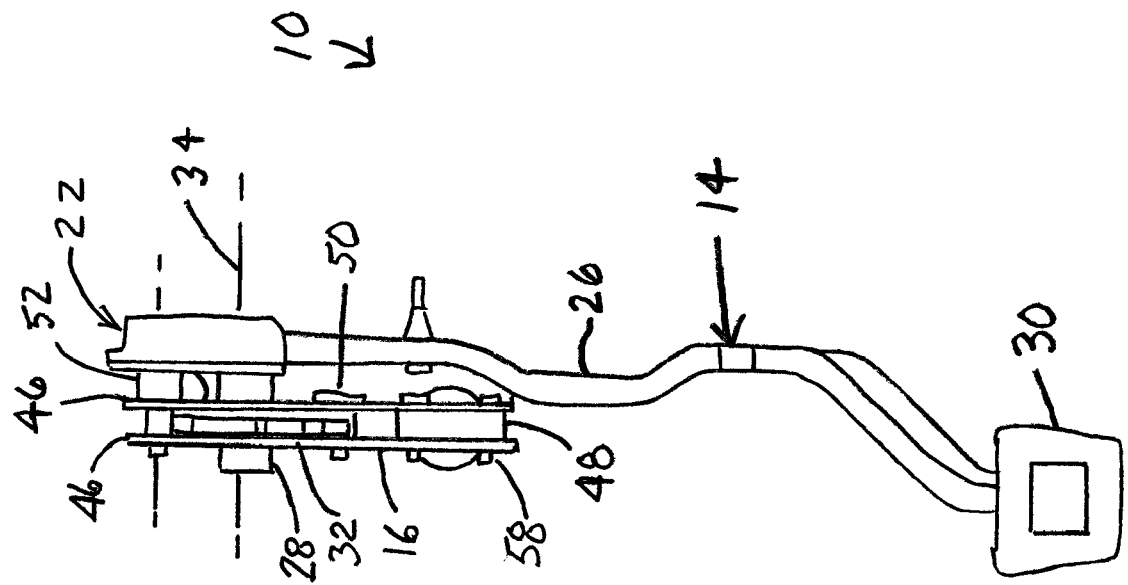
FIG. 2 is a rear elevational view of the control pedal assembly of FIG. 1.
Figure 1:
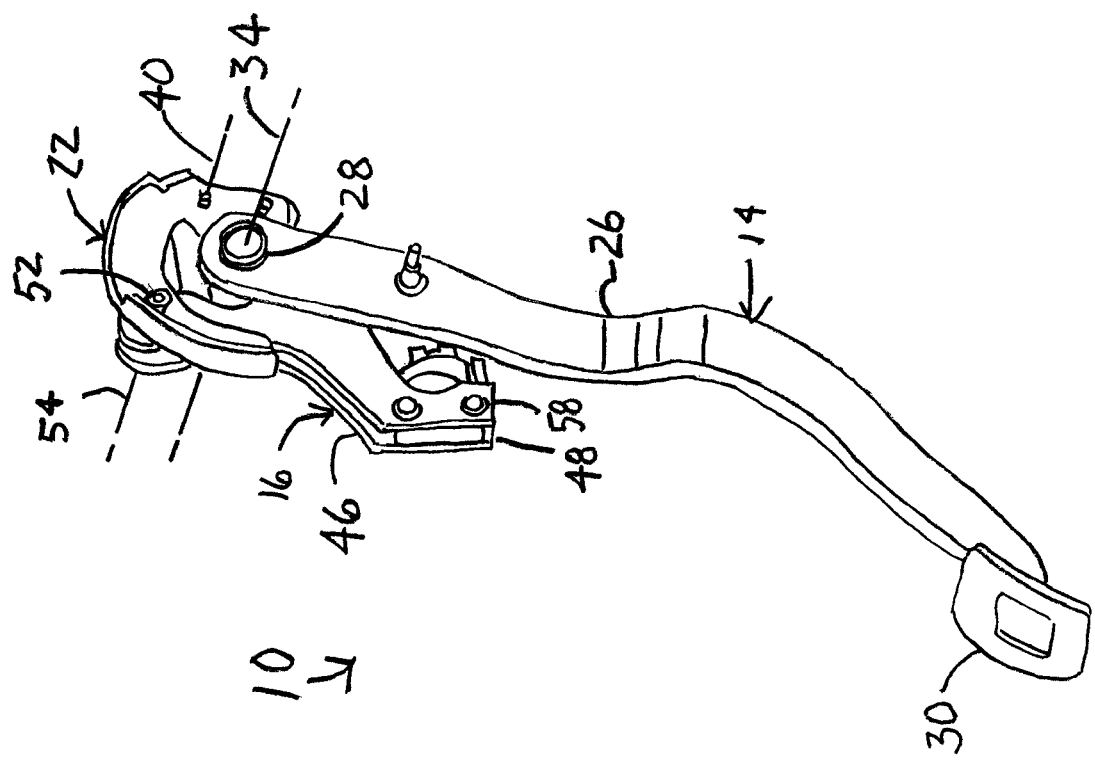
FIG. 1 is a right-rear perspective view of a control pedal assembly according to the present invention.
Figure 6:
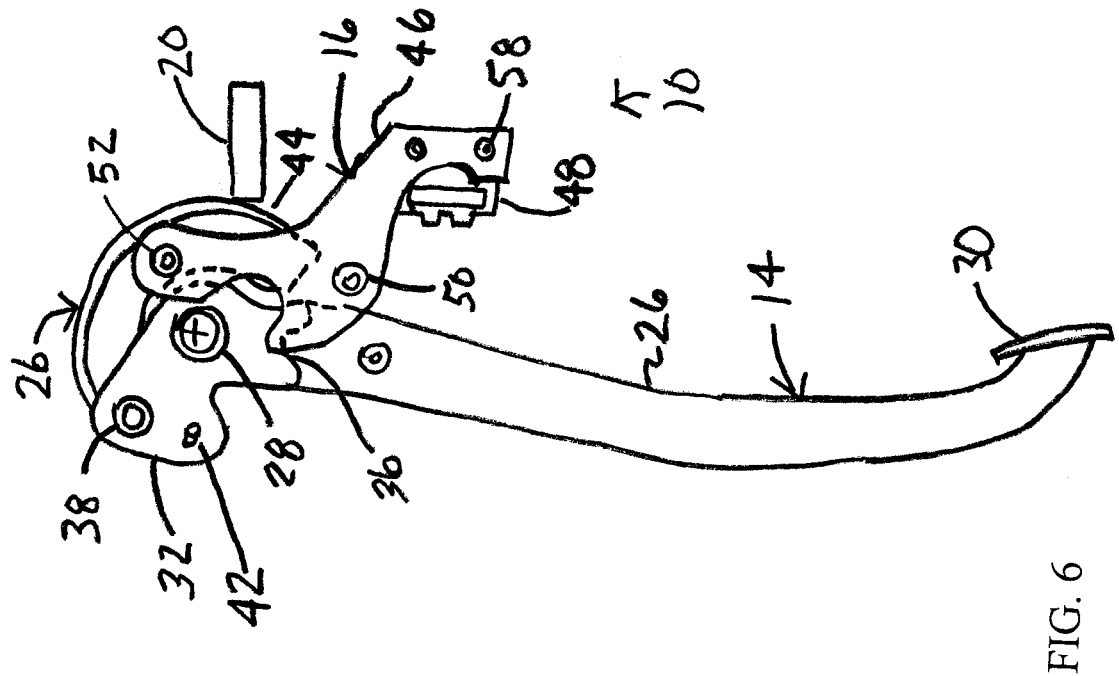
FIG. 6 is a left-side elevational view of the control pedal assembly of FIGS. 1 to 5, similar to FIG. 4 but fully released from an attachment arm due to a frontal vehicle collision.
Figure 4:
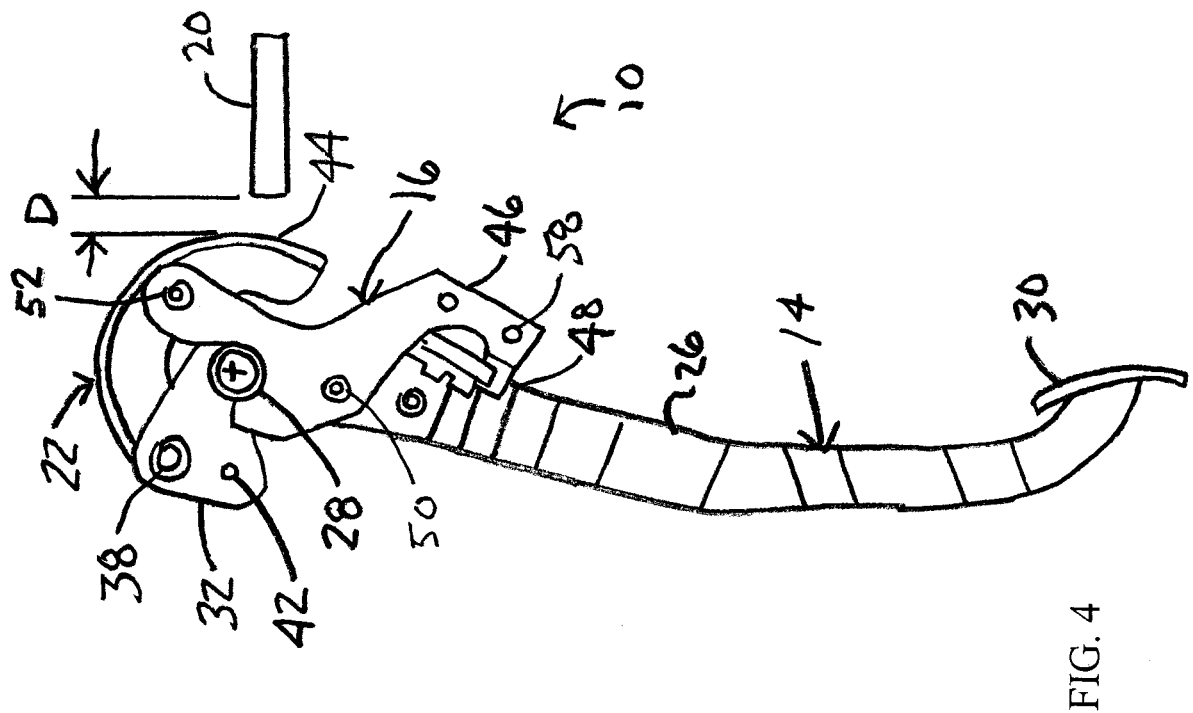
FIG. 4 is a left-side elevational view of the control pedal assembly of FIGS. 1 to 3, wherein the pedal assembly is in its fully applied position during normal operation.

The pedal arm 26 is typically in its at rest position (best shown in FIGS. 1 to 3). To activate the vehicle brake system 18, the operator depresses the pedal arm 26 by depressing the pedal pad 30 in a forward direction with their foot during operation of the motor vehicle 10. When a force is applied to the pedal pad 30, the pedal arm 26 pivots about the pivot axis 34. The pivoting motion of the pedal arm 26 pivots the control bracket 32 and control attachment 16 therewith. The pivoting action of the control attachment 16 pivots the booster bracket 48 therewith and moves the booster link 60 to operate the vehicle brake system 18. Depending on the braking force desired, the pedal arm 26 can be pivoted forward up to its fully applied position (best shown in FIG. 4). When the operator's force is removed from the lower end of the pedal arm 26, a return spring of the brake system 18 resiliently pushes the booster link 60 back which pivots the pedal arm 26 back to its at rest position (best shown in FIGS. 1 to 3). It is noted that alternatively or additionally a return spring can be provided in the pedal assembly 14 which resiliently returns the pedal arm 26 to its at rest position when the operator's force is removed.

When the vehicle 10 is involved in a frontal collision where the first vehicle structure 12, the mounting bracket 24, and the pedal 14 are moved in a rearward direction an amount at least equal to the gap D, the engagement bracket 22 engages the second vehicle structure 20. The gap D is preferably sized in a manner which prevents movement of the pedal 14 into the driver's compartment of the vehicle 10 an amount that may cause injury to the driver. If the engagement bracket 22 strikes the second vehicle structure 20 with at least the predetermined load, the shear pin 42 is destroyed so that the engagement bracket 22 is pivotable relative to the control bracket 32 and the pedal arm 26. Rearward movement of the engagement bracket 22 against the second vehicle structure 20 causes the engagement bracket 22 to pivot downward about its pivot axis 40. The downward movement of the engagement bracket 22 causes the control attachment 16 to pivot downward and rearward so that the release pin 50 is disengaged from the control bracket notch 36 and the pivot 28 is disengaged from the control attachment notch 56 so that the pedal arm 26 is pivotable independent of the control attachment 16. Thus, loads transmitted through the booster link 60 to the control attachment 16 are not transmitted to the driver through the pedal arm 26. The pedal 14 can be easily reset by replacing the shear pin 42.

FIGS. 7 to 12 illustrate a vehicle 100 according to a second embodiment of the present invention. The vehicle 100 according to the second embodiment is substantially the same as the vehicle 10 according to the first embodiment and common reference numbers are used to indicate common structure. The vehicle according to the second embodiment illustrates the crash management system of the present invention can be utilized with a bell-crank style pedal assembly or a in-line pedal assembly.

From the foregoing disclosure it will be apparent that the present invention provides pedal 14 with a crash management system which allows the pedal arm 26 to be in any position between its rest position to its full apply position and still maintain the same amount of motion to release the pedal arm 26 during a collision because the gap D remains constant during operation of the pedal 14. Note also that the pedal arm 26 stays pivotably attached to the mounting bracket 24 after release of the pedal arm 26 from the control system 18. It is further noted that the decoupling features are isolated from loading during normal pedal apply loads.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A vehicle comprising, in combination:
   a first vehicle structure;
   a pedal pivotably connected to the first vehicle structure for pivoting movement in a normal operating range between a rearward position and a forward position;
   a control attachment operably connecting the pedal to a vehicle system to be controlled for transmitting normal operating loads therebetween;
   a second vehicle structure located rearward of the pedal;
   an engagement bracket operably connected to the pedal and sized and shaped to engage the second vehicle structure upon rearward movement of the pedal in a rearward direction during a vehicle frontal collision;
   wherein there is a constant distance between the engagement bracket and the second vehicle structure in the forward-rearward direction as the pedal pivots between the rearward position and the forward position;
   wherein the control attachment operably connected to the engagement bracket to disengage the control attachment from the pedal so that the pedal pivots independent of the control attachment when the engagement bracket strikes the second vehicle structure with a predetermined force; and
   wherein the engagement bracket is secured to the pedal with a frangible connection that breaks at the predetermined force.

2. The control pedal assembly according to claim 1, wherein the engagement bracket is generally arcuate.

3. The control pedal assembly according to claim 2, wherein the engagement bracket has a center of curvature substantially at a pivot axis of the pedal.

4. The control pedal assembly according to claim 1, wherein the engagement bracket is secured to the pedal for pivoting motion therewith during normal operation.

5. The control pedal assembly according to claim 1, wherein the frangible connection comprises a shear pin.

6. The control pedal assembly according to claim 1, wherein the control attachment moves downward relative to the pedal when the frangible connection breaks.

7. The control pedal assembly according to claim 6, wherein the control attachment is pivotably connected to the engagement bracket and pivots downward relative to the pedal when the frangible connection breaks.

8. The control pedal assembly according to claim 1, wherein the control attachment carries a pin which engages a notch of the pedal so that the control attachment pivots with the pedal under normal operation, and wherein the control attachment moves to disengage the pin from the notch so that the pedal pivots independent of the control attachment when the frangible connection breaks.

9. The control pedal assembly according to claim 1, wherein the engagement bracket is pivotably connected to the pedal when the frangible connection breaks.

10. A vehicle comprising, in combination:
    a first vehicle structure;
    a pedal pivotably connected to the first vehicle structure for pivoting movement in a normal operating range between a rearward position and a forward position;
    a control attachment operably connecting the pedal to a vehicle system to be controlled for transmitting normal operating loads therebetween;
    a second vehicle structure located rearward of the pedal;
    an engagement bracket operably connected to the pedal and sized and shaped to engage the second vehicle structure upon rearward movement of the pedal in a rearward direction during a vehicle frontal collision;
    wherein the control attachment is operably connected to the engagement bracket to disengage the control attachment from the pedal so that the pedal pivots independent of the control attachment when the engagement bracket strikes the second vehicle structure with a predetermined force;

wherein the engagement bracket is secured to the pedal with a frangible connection that breaks at the predetermined force;

wherein the control attachment engages the pedal so that the control attachment pivots with the pedal under normal operation; and wherein the control attachment moves to disengage from the pedal so that the pedal pivots independent of the control attachment when the frangible connection breaks.

11. The control pedal assembly according to claim 10, wherein there is a constant distance between the engagement bracket and the second vehicle structure in the forward-rearward direction as the pedal pivots between the rearward position and the forward position.

12. The control pedal assembly according to claim 11, wherein the engagement bracket is generally arcuate.

13. The control pedal assembly according to claim 12, wherein the engagement bracket has a center of curvature substantially at a pivot axis of the pedal.

14. The control pedal assembly according to claim 10, wherein the engagement bracket is secured to the pedal for pivoting motion therewith during normal operation.

15. The control pedal assembly according to claim 10, wherein the frangible connection comprises a shear pin.

16. The control pedal assembly according to claim 10, wherein the control attachment moves downward relative to the pedal when the frangible connection breaks.

17. The control pedal assembly according to claim 16, wherein the control attachment is pivotably connected to the engagement bracket and pivots downward relative to the pedal when the frangible connection breaks.

18. The control pedal assembly according to claim 10, wherein the control attachment carries a pin which engages a notch of the pedal so that the control attachment pivots with the pedal under normal operation, and wherein the control attachment moves to disengage the pin from the notch so that the pedal pivots independent of the control attachment when the frangible connection breaks.

19. A vehicle comprising, in combination:

a first vehicle structure;

a pedal pivotably connected to the first vehicle structure for pivoting movement in a normal operating range between a rearward position and a forward position;

a control attachment operably connecting the pedal to a vehicle system to be controlled for transmitting normal operating loads therebetween;

a second vehicle structure located rearward of the pedal;

an engagement bracket operably connected to the pedal and sized and shaped to engage the second vehicle structure upon rearward movement of the pedal in a rearward direction during a vehicle frontal collision;

wherein there is a constant distance between the engagement bracket and the second vehicle structure in the forward-rearward direction as the pedal pivots between the rearward position and the forward position;

wherein the control attachment is pivotably connected to the engagement bracket to disengage the control attachment from the pedal so that the pedal pivots independent of the control attachment when the engagement bracket strikes the second vehicle structure with a predetermined force;

wherein the engagement bracket is secured to the pedal with a frangible connection that breaks at the predetermined force and is pivotably connected to the pivot pedal when the frangible connection breaks;

wherein the control attachment carries a pin which engages a notch of the pedal so that the control attachment pivots with the pedal under normal operation; and wherein the control attachment pivots downward to disengage the pin from the notch so that the pedal pivots independent of the control attachment when the frangible connection breaks.

* * * * *